J. J. MAHONEY & W. L. NORRIS.
PIPE LAYING MACHINE.
APPLICATION FILED MAY 25, 1915. RENEWED MAY 29, 1916.

1,210,823.

Patented Jan. 2, 1917.
3 SHEETS—SHEET 3.

WITNESSES:
Charles Pickles
Thos Castberg

INVENTORS
John J. Mahoney
William L. Norris.
BY G. H. Strong.
ATTORNEY

UNITED STATES PATENT OFFICE.

JOHN J. MAHONEY, OF SAN FRANCISCO, AND WILLIAM L. NORRIS, OF BERKELEY, CALIFORNIA, ASSIGNORS TO CALIFORNIA PIPE LINE MACHINE CO., OF SAN FRANCISCO, CALIFORNIA, A CORPORATION OF CALIFORNIA.

PIPE-LAYING MACHINE.

1,210,823. Specification of Letters Patent. Patented Jan. 2, 1917.

Original application filed May 7, 1913, Serial No. 766,056. Divided and this application filed May 25, 1915, Serial No. 30,339. Renewed May 29, 1916. Serial No. 100,700.

*To all whom it may concern:*

Be it known that we, JOHN J. MAHONEY, of the city and county of San Francisco and State of California, and WILLIAM L. NORRIS, of Berkeley, in the county of Alameda, State of California, citizens of the United States, have invented new and useful Improvements in Pipe-Laying Machines, of which the following is a specification.

This invention relates to a pipe laying and screwing machine.

It is the object of this invention to provide a machine capable of alining sections of pipes to be connected together, laying the connected pipes to form pipe lines for conveying water, oil and other fluids, and capable also of taking up such pipe lines to permit the sections to be disconnected. We accomplish this object by the provision of a machine to receive the sections of pipe to be connected and means for raising and lowering the machine and pipe in relation to the ground by a power plant carried by the machine.

One form which our invention may assume is exemplified in the following description and illustrated in the accompanying drawings, in which—

Figure 1:
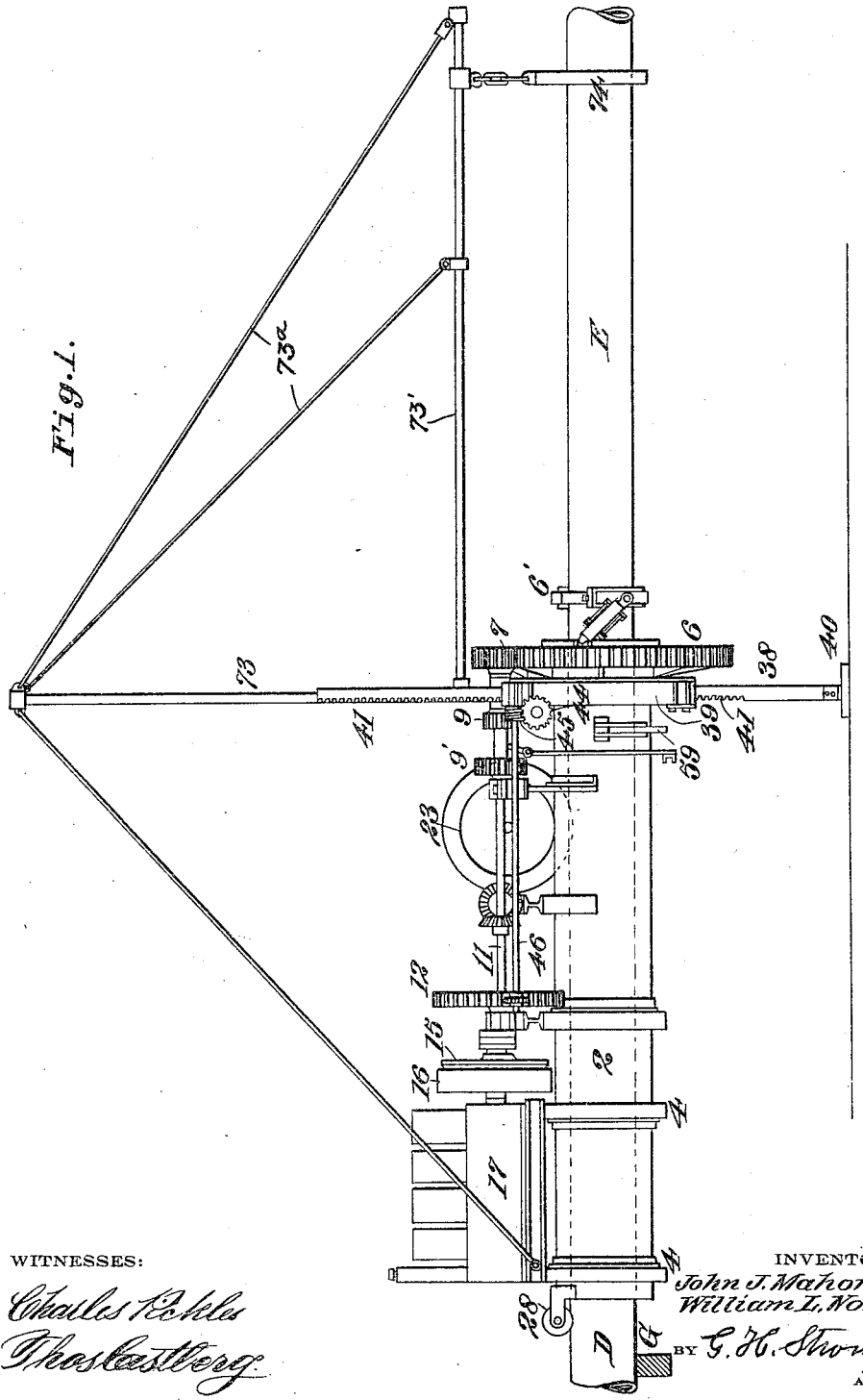
Figure 2:
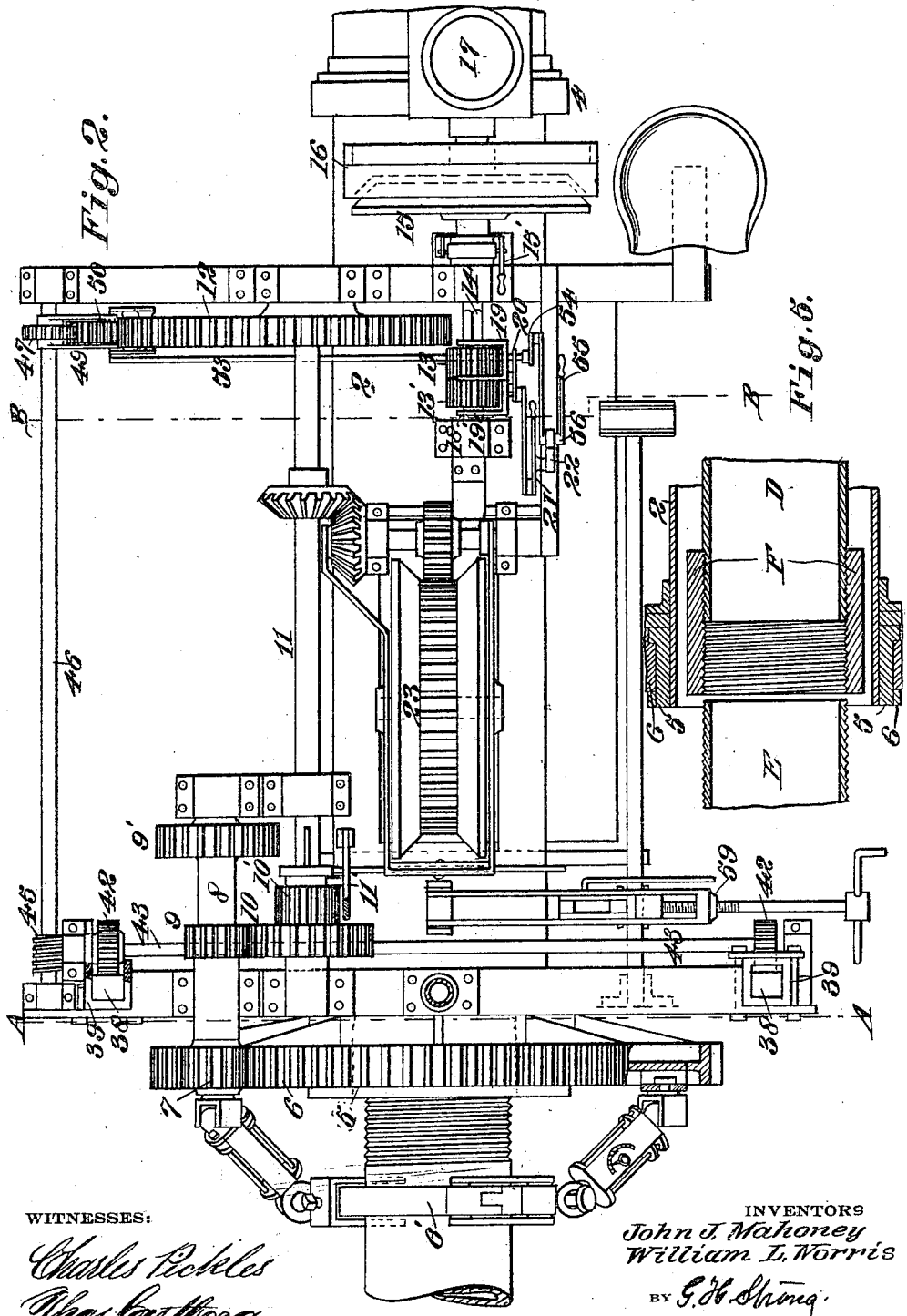
Figure 3:
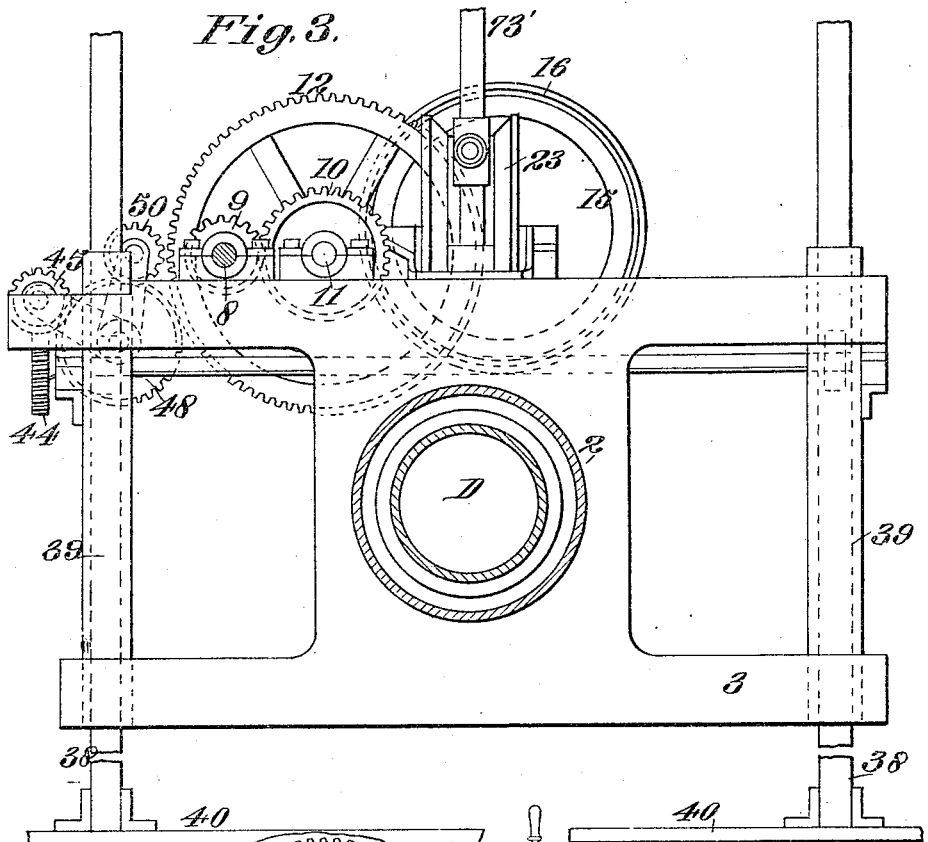
Figure 4:
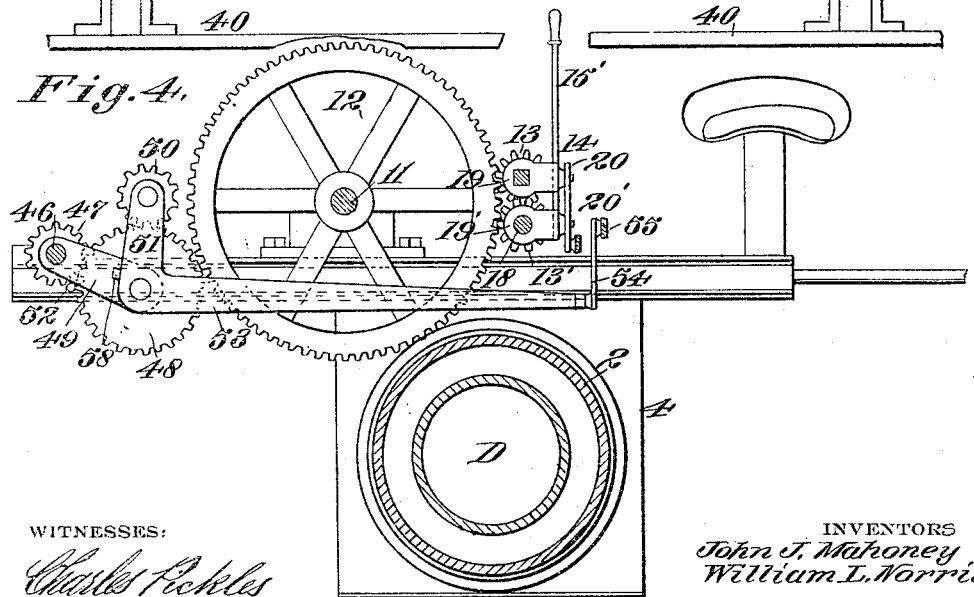

Figure 1 shows a side elevation of a machine embodying our invention with the pinions 13, 13′ and their shifting mechanism being omitted for the sake of clearness. Fig. 2 is a plan view of the same, with portions broken away. Fig. 3 is a detail section and elevation on the line A—A of Fig. 2. Fig. 4 is a detail section on the line B—B of Fig. 2. Fig. 5 is a detail sectional view of the front end of the carriage, illustrating the pipe coupling.

In the drawings, the frame or carriage body of the machine is indicated at 2, and is here shown as consisting of a tubular member adapted to surround the pipe to be laid. This carriage body 2 is preferably formed of a larger diameter of pipe. The forward end of the carriage body 2 extends through and is secured to a channel plate 3, and is provided with similar channel plates 4 throughout its length to form suitable supports for the bearings of various mechanisms to be hereinafter described.

Revolubly mounted on a bushing 5, secured to the forward end of the carriage 2, is a toothed wheel 6, which wheel is adapted to be rotated by means of a pinion 7, carried on a short shaft 8, journaled in suitable bearings. The shaft 8 carries a pair of spaced toothed wheels 9 and 9′, which are adapted to be engaged by toothed wheels 10 and 10′ of different diameters, mounted to move longitudinally on a countershaft 11 and revoluble therewith. The toothed wheels 10 and 10′ are adapted to be shifted by means of a hand lever 11′ to throw the toothed wheel 10 into engagement with the toothed wheel 9, the toothed wheel 10′ into engagement with the toothed wheel 9′, or dispose the toothed wheels 10 and 10′ between the toothed wheels 9 and 9′ out of engagement therewith. The wheel 6 has connected to it a pipe gripping member 6′, and with other mechanism, not necessary to be here specifically described, constitute the pipe screwing means which form the basis of a separate application filed of even date herewith, Ser. No. 30,341.

The countershaft 11 extends parallel with the carriage 2 and is revolubly mounted in suitable bearings carried by the channel plates 3 and 4. A toothed wheel 12 is mounted on the countershaft 11 and is adapted to be engaged by either one of two pinions 13 and 13′. The pinion 13 is slidably mounted on the squared portion of a shaft 14, on which is mounted a friction disk 15, adapted to be thrown in and out of engagement with the fly-wheel 16 on the drive shaft of a suitable engine or motor 17, mounted on the carriage 2. The pinion 13′ is an idler and is loosely mounted on a stud shaft 18 and is in constant mesh with the pinion 13. The pinions 13 and 13′ are designed to slide lengthwise on their respective shafts 14 and 18 and are adapted to be thrown alternately in and out of engagement with the toothed wheel 12 to rotate the latter and the shaft 11 when the shaft 14 is connected with the engine shaft through the clutch 15 and fly-wheel 16.

The means for shifting the pinions 13 and 13′ is here shown as consisting of yokes 19 and 19′, which are slidably mounted on the shafts 14 and 18 and extend on the opposite sides of the pinions 13 and 13′. The yokes 19 and 19′ are connected together by means of a link 20 which is slotted longitudinally to receive pins 20' carried by the yokes 19 and 19'. The lower end of the link 20 is connected to a hand lever 21, fulcrumed at 22, in such a manner that when the hand lever 21 is rocked, the link 20 will operate to move the pinion 13 in one direction and the pinion 13' in the opposite direction. The pinions 13 and 13' have a limited movement on their respective shafts 14 and 18, and are so arranged and positioned, in relation to each other, that when disposed in an intermediate position, as shown in Fig. 2, the pinions 13 and 13' will be out of engagement with the gear 12. By shifting the hand lever 21 to the right the pinion 13 will be thrown into mesh with the toothed wheel 12 to drive the latter directly from the shaft 14, and when the hand lever 21 is thrown to the extreme position to the left, the pinion 13 will be moved out of mesh with the toothed wheel 12 and the pinion 13 will be thrown into mesh with the toothed wheel 12, so that the latter will be rotated indirectly from the shaft 14 through the pinions 13 and 13'; the pinion 13' being of such width as to be engaged by the pinion 13 when the latter is in its outermost position.

By the operation of the hand lever 21 to shift the pinions 13 and 13', as just described, the direction of rotation of the toothed wheel 12 and counter shaft 11 may be varied as desired and rotated by means of the engine 17 through the clutch 15 and shaft 14.

The carriage 2 is designed to travel and be propelled in either direction on the pipe line for constructing which this machine is designed. For this purpose a flanged tractor wheel 23 is provided, adjacent to the forward end of the machine, but the actuating mechanism therefor need not herein be described in detail as it forms the subject-matter of a separate application filed of even date herewith, Ser. No. 30,340.

A pair of beveled trailing wheels 28, adapted to travel on the pipe D, is provided at the rear end of the carriage to form a revoluble support for this end of the carriage on the pipe D, as shown in Fig. 1.

Means are provided for supporting the outer end of the carriage body 2 independent of the pipe line D, and by means of which the carriage body 2 may be held securely against movement either longitudinally, laterally, or vertically. This means is here shown as consisting of a pair of vertical standards 38, which are slidably mounted in guides 39, carried by the channel plate 3. The lower ends of the standards 38 are connected together by means of a growler board 40. The growler board 40 is adapted to rest upon the ground and span a ditch or trench, and form a level support for the standards when the ground is rough and uneven.

Formed on the standards 38 are rack teeth 41 which are engaged by pinions 42, mounted on a shaft 43, supported by suitable bearings on the channel plate 3. A worm-wheel 44 meshing with a worm-pinion 45 on a shaft 46 serves to lock the shaft 43, pinions 42 and the standards 38 against movement when the shaft 46 is not rotated. The shaft 46 is designed to be rotated in either direction from the toothed wheel 12 to rotate the shaft 43 and pinions 42, through the worm-pinion 45 and worm-wheel 44, and thereby cause the forward end of the carriage frame to move up and down on the standards 38.

Means are provided for gearing the shaft 46 to the toothed wheel 12 directly and indirectly and which is adapted to be thrown out of connection with the toothed wheel 12 when the machine is in a stationary position so as not to transmit motion to the shaft 46 from the toothed wheel 12. This means is here shown as consisting of a pinion 47, keyed on the shaft 46; a toothed wheel 48 meshing with pinion 47 and carried by rocker arms 49 pivoted on the shaft 46, and a pinion 50 meshing with the toothed wheel 48 and carried by arms 51 pivoted to rock on the axis of the toothed wheel 48. The arms 49 normally gravitate to a lowermost position against a stop 52, in which position the teeth of the wheel 48 will be out of mesh with the teeth of the wheel 12.

The arms 51, carrying the pinion 50, are connected to a lever 53 which extends inwardly over the carriage body 2 and is connected by a link 54 to a bell-crank lever 55, fulcrumed at 56 and adapted to be rocked by hand to throw the pinion 50 or the toothed wheel 48 in and out of engagement with the toothed wheel 12. The lever 55 normally gravitates on its fulcrum 56 to position the pinion 50 in mesh with the toothed wheel 12 and is held in an intermediate position in any desired manner to dispose the pinion 50 out of engagement with the toothed wheel 12.

A stop 58 is provided on the arm 49 to limit the rearward movement of the arms 51 in such a manner that when the lever 55 is rocked to the left to elevate the lever 53, the arms 51 will engage the stop 58 to cause the arm 49 to move in an upward direction and throw the toothed wheel 48 into engagement with the toothed wheel 12, so that when the latter is rotated a rotary motion will be transmitted from the wheel 12 through the wheel 48 and pinion 47, shaft 46, worm-pinion 45, worm-wheel 44, shaft 43, and pinion 42, to cause the latter to move in one direction on the racks 41 formed on the standards 38. By throwing the hand lever 55 to the extreme right, the lever 53 will be moved downward to position the pinion 50 in engagement with the toothed wheel 12, so as to transmit a rotary motion to the pinions 42 through the pinion 50 and toothed wheel 48, etc., to move the pinions 42 in a reversed direction on the standards 38.

In the operation of this invention, the pipe D is introduced into the carriage body 2, with its outer end carrying the coupling F, disposed adjacent to the outer or forward end of the carriage body 2, as shown in Fig. 5, the pipe D being supported rearward of the carriage 2 on timbers G, or in any other suitable manner. The height of the carriage 2 is regulated to position it parallel with the pipe D, so that the outer end of the pipe D will be concentric with the toothed wheel 6. This vertical adjustment of the carriage is accomplished by operating the hand lever 55 to throw either the pinion 50 or the toothed wheel 48 into engagement with the toothed wheel 12, according to whether it is desired to move the carriage 2 in an upward or a downward direction. On rotating the toothed wheel 12, which is done by throwing either the pinion 13 or 13' into mesh with the toothed wheel 12, and throwing the clutch 15 into engagement with the fly-wheel 16 by means of a hand lever 15', rotary motion is transmitted from the engine shaft through the shaft 14 to the toothed wheel 12. This rotation of the toothed wheel 12 causes the shaft 46 to revolve through the pinion 47 and thereby rotates the worm-pinion 45 and the worm-wheel 44 to rotate the shaft 43 and thereby causes the pinions 42 to travel up or down on the toothed racks 41 on the standards 38. The standards 38 being supported at their lower ends on the growler board 40, which in turn rests upon the ground or any other suitable means of support, causes the outer end of the carriage to move up or down with relation to the standards 38. The rear end of the carriage 2 being supported on the pipe D, through the rollers 28, the latter will act as a fulcrum or center on which the carriage 2 will rock vertically, when being adjusted as just described, to the extent of movement permitted by the space between the outer end of the pipe D and the inner wall of the carriage 2.

Mounted on the channel plate 3, at the front end of the machine (see Figs. 1 and 3) is a mast 73 carrying a boom 73' which extends forward of the carriage body 2 and carries a pipe-engaging hook 74 adjacent to its outer end. The boom 73' is supported by stays 73ª connecting with the mast 73 which in turn is rigidly held by guys connecting with the carriage body at suitable points. This hook 74 is adapted to engage and support a length of pipe E which is to be connected to the pipe D.

It will be seen, when the carriage 2 is supported on the standards 38, that when the timbers G are removed the outer end of the pipe D will be supported by the carriage body 2. This will permit of the pipe D being raised and lowered in unison with the carriage to dispose the carriage and the pipe on any desired plane. By removing the timbers or supports G, adjacent to the rear end of the carriage 2, the latter may be lowered sufficiently to bring the hook 74 in close proximity with the ground, where it may be engaged with a loose length of pipe E; the pipe D being of sufficient flexibility between the rear end of the carriage 2 and its supports G, which may be spaced as far rearward of the carriage as may be desired, to permit the downward movement of the forward end of the carriage 2 necessary to bring the hook 74 into engageable relation with the pipe E.

After the hook 74 has been engaged with the pipe E, the carriage 2 is elevated, thereby lifting the pipe E clear of the ground and suspending it from the boom 73, in alinement with the axis of the toothed wheel 6 and pipe D, the carriage 2 being raised to such a point as to dispose the open end of the pipe D concentric with the toothed wheel 6, as before described. When the proper vertical adjustment of the carriage 2 is obtained, the hand lever 55 is operated to throw the pinion 50 and toothed wheel 48 out of engagement with the toothed wheel 12, as shown in Fig. 3. This action disconnects the shaft 46 from the engine. The weight of the forward end of the machine will now be supported on the pinions 42 and standards 38. The pinions 42 and the shaft 43 on which they are mounted are held against rotation by reason of the worm-wheel 44 meshing with the worm-pinion 45. When the parts have been positioned as just described, the pipe D is clamped rigidly to the carriage 2 by means of mechanism 59. This being done, the pipe and carriage are securely locked together ready for the screwing operation.

When the pipe E has been set in position, the clamping mechanism 6' is released therefrom. Timbers or blocks, not shown, are then placed beneath the pipe E at a suitable distance from the carriage 2 so as to support the pipe E, and the timbers G are placed under the pipe D adjacent to the rear end of the carriage 2. The pinions 42, engaging with the racks 41 on the standards 38, are then caused to revolve, as before described, in such a manner as to move the standards 38 in an upward direction and thereby leave the carriage 2 supported upon the pipe D. The forward end of the carriage 2 moves downwardly into contact with the pipe D before the standards 38 begin to move upwardly. When the standards 38 have moved sufficiently far so that the growler board 40 will clear any obstacles that may be in front thereof and the pinions 43 are thrown out of operation, the carriage body, if desired, may be moved along the pipe line, under its own power, or otherwise, to the next position of operation.

When the apparatus has been moved to the forward end of the pipe E, standards 38 are moved downward to position the growler board 40 on the ground, as before described, whereupon another loose section of pipe E is picked up and the level of the carriage 2 adjusted in readiness for another pipe screwing operation, as before described. By providing the adjustable standards 38 so arranged as to span a ditch or trench, the pipe line may be laid and lowered into a ditch when occasion so requires, and by reason thereof, pipe lines already laid may, obviously, be taken up for disconnection or other purposes.

This application is a division of our former application patented June 22, 1915, and bearing number 1,143,844.

While we have shown and described herein but one form of our device, it is to be understood that the same is susceptible of modification, and, therefore, many changes in the construction and arrangement of the several parts may be resorted to without departing from the spirit of our invention as disclosed in the appended claims.

Having thus described our invention, what we claim and desire to secure by Letters Patent is—

1. In a pipe laying machine, the combination of a frame to receive a pipe, a trailer wheel carried by the frame for supporting one end thereof on the pipe, and means connected with the other end of the frame for adjusting the latter.

2. In a pipe laying machine, the combination of a frame to receive a pipe and adapted to be carried upon and supported at one end by said pipe and a support for the other end of the pipe, said support including means for adjusting said frame to vary the angle and elevation of the pipe.

3. In a pipe laying machine, the combination of a cylindrical member adapted to be carried on a pipe and to be supported at one end upon the ground and at its other end on the pipe, and means for centering the pipe within the member.

4. In a pipe laying machine, the combination of a supporting member adapted to be supported on a pipe line, a pipe receiving member carried thereby for holding a pipe section in alinement with and to be secured to the pipe line, and means for adjusting said supporting member vertically in either direction to aline the pipe section with the pipe line.

5. In a pipe laying machine, the combination of a main frame to receive and support a pipe, an outrigger carried by said frame to receive another pipe in line with the first mentioned one, and means for adjusting said frame and outrigger to bring said pipes into alined positions to be screwed together.

6. In a pipe laying machine, the combination of a frame provided with means for supporting it on a pipe line, a pipe receiving member carried thereby and movable into and out of a trench, and means for operating said receiving member to lower or raise a pipe into or out of the trench.

7. In a pipe laying machine, the combination of means to receive pipe sections and aline them for endwise connection, power means, operative connections between the two, and controlling means for said connections.

8. In a pipe laying machine, the combination of an adjustably movable frame, pipe receiving members on said frame for bringing pipe sections into endwise alinement when said frame is moved, actuating means for said frame, and power mechanism carried by the frame and operatively connected with said actuating means.

9. In a pipe laying machine, the combination of a carriage to receive a pipe, adjustable supporting members for said carriage, and power means mounted on said carriage for operating said adjustable members.

10. In a pipe laying machine, the combination of a carriage to receive a pipe, a motor mounted on said carriage, adjustable supporting legs for said carriage and comprising vertically arranged reciprocal bars having rack teeth formed thereon, pinions mounted on a shaft meshing with said racks, and means for rotating said shaft in either direction by said motor.

11. In a pipe laying machine, the combination of a carriage to receive a pipe, a motor mounted on said carriage, adjustable supporting legs for said carriage and comprising vertically arranged reciprocal bars having rack teeth formed thereon, pinions mounted on a shaft meshing with said racks, and means for rotating said shaft from said motor, including a worm wheel and pinion adapted to lock the shaft when not in operation, to lock the pinions in the racks.

12. In a pipe laying machine, a carriage provided with means to permit it to travel along a pipe line, a pair of standards slidably mounted on said carriage, a growler board connecting said standards, and means for reciprocating the carriage and standards in relation to each other to dispose the carriage in various vertical planes.

13. In a pipe laying machine, a carriage, a motor on said carriage, means operable by the motor for driving the carriage horizontally, standards slidably mounted on said carriage, means operable by the motor for moving the carriage vertically on the standards, and means for locking the carriage in relation to the standards.

14. In a pipe laying machine, a frame, adjustable supporting means for the frame including a shaft and a pinion thereon, a drive shaft, a toothed wheel on the drive shaft, a gear meshing with the pinion, a swinging support for the gear provided to move the gear to and from meshing relation with the toothed wheel to establish a transmission between the latter and the pinion, a lever pivoted to the swinging support for limited movement, a pinion carried by the lever and adapted to be moved to operatively connect the toothed wheel and the gear when separated, and means moving the lever to disengage the second pinion from the toothed wheel and when limited in its pivotal movement on the swinging support to move the latter therewith for meshing the toothed wheel with the gear.

15. In a pipe laying machine, a frame, adjustable supporting means for the frame including a shaft and a pinion thereon, a drive shaft, a toothed wheel on the drive shaft, a gear meshing with the pinion, a swinging support for the gear provided to move the gear to and from meshing relation with the toothed wheel to establish a transmission between the latter and the pinion, a lever pivoted to the swinging support in concentric relation to the gear, a stop on the swinging support with which the lever is adapted to engage for swinging said support with it to intermesh the gear and toothed wheel, a pinion carried by the lever in meshing relation to the gear and adapted on movement of the lever on the swinging support to connect operatively the gear and toothed wheel, and means for operating the lever.

In testimony whereof we have hereunto set our hands in the presence of two subscribing witnesses.

JOHN J. MAHONEY.
WILLIAM L. NORRIS.

Witnesses:
JOHN H. HERRING,
W. W. HEALEY.

Copies of this patent may be obtained for five cents each, by addressing the "Commissioner of Patents, Washington, D. C."